March 14, 1967 M. A. RAICHELSON ET AL 3,308,865
BOLT ANCHORING MEANS
Filed May 4, 1965

INVENTORS
Melvin A. Raichelson
Richard H. Sullivan
BY
Johnson and Kline
ATTORNEYS

United States Patent Office 3,308,865
Patented Mar. 14, 1967

3,308,865
BOLT ANCHORING MEANS
Melvin A. Raichelson, Springfield, Mass., and Richard H. Sullivan, Cromwell, Conn., assignors to American Standard Products Incorporated, Hartford, Conn., a corporation of Connecticut
Filed May 4, 1965, Ser. No. 453,078
2 Claims. (Cl. 151—7)

The present invention relates to a novel anchoring bushing for anchoring a bolt or a stud to a structure.

Heretofore, bushings have been threaded into sockets and provided with interior threads into which a bolt or a stud may be threaded to be anchored therein. In some instances a pellet of nylon or other deformable material has been positioned on the inside of the wall of the bore to engage the thread of the stud so as to resist inadvertent removal of the bolt or stud. It has been found from experience, however, that quite frequently after the bolt or stud has been removed and replaced several times, there is a tendency for the bushing to "back out" of the socket into which it is threaded when the bolt is removed. Also, in some instances, the pellet, being mounted in a recess in the bushing, after the bolt has been removed several times, has a tendency to become loosened and drop out of its recess.

The present invention overcomes these problems by providing a novel bushing construction which will securely anchor a bolt or stud to a support and will effectively resist the backing out of the bushing from the socket during repeated removal of the bolt or stud therefrom.

This is accomplished by providing a bushing of harder material than the support which has a threaded socket into which the bushing is threaded, by providing on the outer surface of the bushing a locking thread, and by providing a hole through the bushing side wall into which a plug of nylon or other deformable material is inserted to project from the outer surface and into a threaded bore in the bushing. The locking thread, as the bushing is threaded into the socket by the usual inserting tool, causes the threads of the walls of the socket to deform and the material thereof to flow and effectively bind the bushing in the socket against unintentional removal. Also, the material of the end of the nylon plug which projects from the outer surface is deformed and displaced during the action of the locking thread in deforming the walls of the socket and spreads into overlapped or interlocked relation with the locking threads on the outer surface of the bushing and is clamped in position in the hole in the side wall of the bushing so that it provides additional resistance to turning of the bushing in the socket. Also, the deformation of the end of the plug holds the nylon plug securely in the wall of the bushing so that it is retained in position irrespective of the number of times the stud or bolt is removed.

Thus, there is provided a simple yet highly effective bushing construction for anchoring a bolt or stud to a support and one which will not unintentionally back out of the socket.

Other features and advantages of the invention will be apparent from the specification and claims when considered in connection with the accompanying drawings in which:

Figure 1:
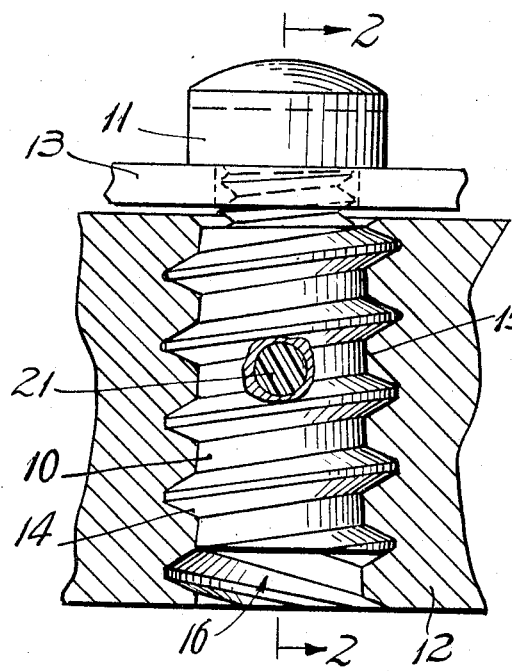
FIGURE 1 is a view, partly in section, of the bushing positioned in a socket with a bolt disposed therein.

While the bushing of the present invention can be used to secure bolts or studs in position on a support, in the herein illustrated form of the invention a bushing 10 is shown as securing a bolt 11 to a support or body 12, the head of which bolt clamps a plate 13 to the support. The term "bolt" as used herein embraces studs as well as headed bolts.

In accordance with the present invention, the bushing 10 is formed of a harder material than the body of the support and is provided on its outer surface with a locking thread 14 of the type disclosed in U.S. Patent No. 2,437,-638, which thread has a broad inclined surface 15 at the root thereof. When the bushing is screwed into a socket 16 in the support having a standard thread 17 on the walls of the socket, it will cause the thread 17 to deform and the material thereof to flow and be displaced so as to provide a secure locking engagement due to interference between the elements of the threaded bushing and the walls of the socket. This threaded connection, because of the inclination of the root and deformation of the socket threads, has a tendency to cause a binding action between the threads as an incident of vibration and thus prevents movement of the bushing on the support due to said vibration.

Figure 3:
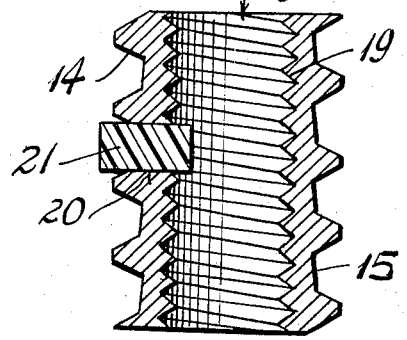
FIG. 3 is a sectional view of the bushing showing the plug in position prior to its insertion in a socket.

The bushing has a bolt receiving bore 18 therein which is provided with a standard thread 19 to receive the bolt threaded therein and anchor it to the support. As shown in the drawings, the bushing has a hole 20 extending through the wall thereof into which a plug 21 of nylon or other deformable material is inserted with the ends thereof projecting from each end of the hole 20 as shown in FIG. 3.

Figure 2:
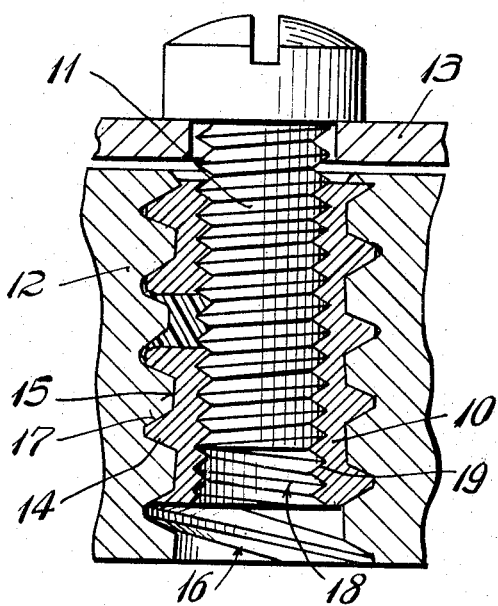
FIG. 2 is a sectional view taken along lines 2—2 of FIG. 1.

As the bushing is driven into the socket with the usual driving tool, not shown, it will cause the threads on the wall of the sockets to be deformed and the material displaced and will also cause the end of the plug 21 to be deformed to conform with the deformed threads of the socket with portions of the nylon overlying the ends of and interlocking with the threads as shown in FIG. 2 securely locking the plug in the hole. The inner surface of the plug 21 will be deformed or distorted as the bolt is threaded therein, as shown in FIG. 2, to produce a binding effect on the threads to prevent inadvertent movement therefrom.

With this combination of locking thread and deformed end of the plug, it will be seen that a greater friction or resistance to turning is provided between the threads on the outer surface of the bushing and the socket than with the bolt and the end of the plug secured in the interior of the bushing so that repeated removal of the bolt can be achieved without inadvertently causing the bushing to back out of the socket.

Variations and modifications may be made within the scope of the claims and portions of the improvements may be used without others.

We claim:
1. A bolt anchoring device comprising a cylindrical bushing having a locking thread on the outer surface adapted to be threaded into a threaded socket in a body of softer material than the bushing, the locking thread on the bushing being generally triangular in cross-section with a truncated crest and a broad inclined surface at the root disposed at a slight angle to the axis of the bushing with the flanks of the threads on the body and bushing engaging with an interference fit and capable of causing the material of the threads on the body to be deformed and to flow to fill up any voids including the void between the crest on the threads in the socket and the inclined root surfaces thereof and securely lock the bushing in the socket as an incident to the threading of the bushing into the socket, said bushing having a bolt-receiving threaded bore therethrough, the improvement wherein the bushing is provided with a radially disposed aperture formed in said bushing completely through the wall thickness thereof and between the crests of a pair of thread convolutions, the walls forming said aperture intersecting the opposed flanks of said pair of threads, the axial distance between said walls being greater than the surface of the root, but less than the distance between the opposed flanks measured at the crests of said thread whereby a space is formed between the crests of the mating thread on said body and said radially extending walls, and a deformable synthetic resinous plug disposed in the hole having a volume filling the hole and projecting beyond the threads on the outside and inside of the bushing, the end of the plug projecting on the outside of the bushing being deformed by the threads on the body as the bushing is threaded into the body and flowing into said space between said mating threads and the walls of said aperture to thereby interlock with the threads on the bushing and on the body to resist turning of the bushing in the socket and also to hold the plug in position on the bushing and the other end of the plug being shaped by the threads on the bolt to resist turning thereof.

2. A bolt anchoring device comprising a cylindrical bushing having a locking thread on the outer surface adapted to be threaded into a threaded socket in a body of softer material than the bushing, the locking thread on the bushing being generally triangular in cross-section with a truncated crest and a broad inclined surface at the root disposed at a slight angle to the axis of the bushing with the flanks of the threads on the body and bushing engaging with an interference fit and capable of causing the material of the threads on the body to be deformed and to flow to fill up any voids including the void between the crest on the threads in the socket and the inclined root surfaces thereof and securely lock the bushing in the socket as an incident to the threading of the bushing into the socket, said bushing having a bolt-receiving threaded bore therethrough, the improvement wherein the bushing is provided with a circular hole of uniform diameter extending radially completely through the side wall thereof and between the crests of a pair of thread convolutions, the walls forming said hole intersecting the opposed flanks of said pair of threads, the axial distance between said walls being greater than the surface of the root, but less than the distance between the opposed flanks measured at the crests of said thread whereby a space is formed between the crests of the mating thread on said body and said radially extending walls, and a deformable cylindrical nylon plug disposed in the hole having a volume filling the hole and projecting beyond the threads on the outside and inside of the bushing, the end of the plug projecting on the outside of the bushing being deformed by the threads on the body as the bushing is threaded into the body and flowing into said space between said mating threads and the walls of said hole to thereby interlock with the threads on the bushing and on the body to resist turning of the bushing in the socket and to hold the plug in position on the bushing and the other end of the plug being shaped by the threads on the bolt to form a releasable lock therewith with the combination locking thread and nylon plug providing a greater resistance to turning of the bushing in the socket than the nylon plug resists turning of a bolt in the bushing whereby the bolt can be removed from the bushing without displacement of the bushing.

References Cited by the Examiner

UNITED STATES PATENTS

| | | | |
|---|---|---|---|
| 2,437,638 | 3/1948 | Evans | 151—22 |
| 2,544,096 | 3/1951 | Laughlin | 151—7 |
| 2,725,915 | 12/1955 | Johnson | 151—7 |
| 2,922,455 | 1/1960 | Braendel | 85—47 |
| 3,247,877 | 4/1966 | Evans | 151—22 |

CARL W. TOMLIN, *Primary Examiner.*

R. S. BRITTS, *Assistant Examiner.*